US006003577A

United States Patent [19]

Morito

[11] Patent Number: 6,003,577

[45] Date of Patent: Dec. 21, 1999

[54] APPARATUS FOR MANUFACTURING A BEAD-INLAID PICTURE AND METHOD

[75] Inventor: Yuhkoh Morito, Yokohama, Japan

[73] Assignee: Moritex Corporation, Tokyo, Japan

[21] Appl. No.: 08/928,396

[22] Filed: Sep. 12, 1997

[30] Foreign Application Priority Data

| | | | |
|---|---|---|---|
| Sep. 13, 1996 | [JP] | Japan | 8-242841 |
| Dec. 12, 1996 | [JP] | Japan | 8-332556 |

[51] Int. Cl.$^{6}$ ...... B32B 31/00

[52] U.S. Cl. ...... 156/362; 156/64; 156/350; 156/562; 156/584; 221/69; 221/70; 221/71; 221/73; 221/289; 382/162; 382/164

[58] Field of Search ...... 156/64, 350, 362, 156/562, 584; 382/162, 164; 221/69, 70, 289, 71, 73

[56] References Cited

U.S. PATENT DOCUMENTS

| | | | |
|---|---|---|---|
| 5,116,454 | 5/1992 | Kurihara | 156/584 |
| 5,317,648 | 5/1994 | Sawada et al. | 382/162 |
| 5,443,680 | 8/1995 | Gerber | 156/362 |

*Primary Examiner*—Richard Crispino
*Assistant Examiner*—Robert R. Koehler
*Attorney, Agent, or Firm*—Pillsbury Madison & Sutro, LLP

[57] ABSTRACT

A method of manufacturing a bead-inlaid picture by inputting a desired original image as a motif for a bead-inlaid picture by an image input device, dividing the inputted original image into each of pieces in a size equal with that of a bead, comparing numerical data for the hue and the brightness obtained for each of the pieces and numerical data for the hue and the brightness predetermined for each of the beads and replacing the numerical data for each of the pieces with a color code allocated to a bead having numerical data most approximate with the obtained data and outputting signals corresponding thereto by an image processing device, feeding beads allocated with color codes while dividing them on every color codes by a feeder, arranging the thus fed beads in accordance with the arranged sequence for each of the pieces in the original image by an actuator and, fusing the arranged beads on a glass plate. A bead-inlaid picture can be manufactured just in accordance with the original image at high quality and at a reduced cost quite automatically without requiring any particular skill.

9 Claims, 10 Drawing Sheets

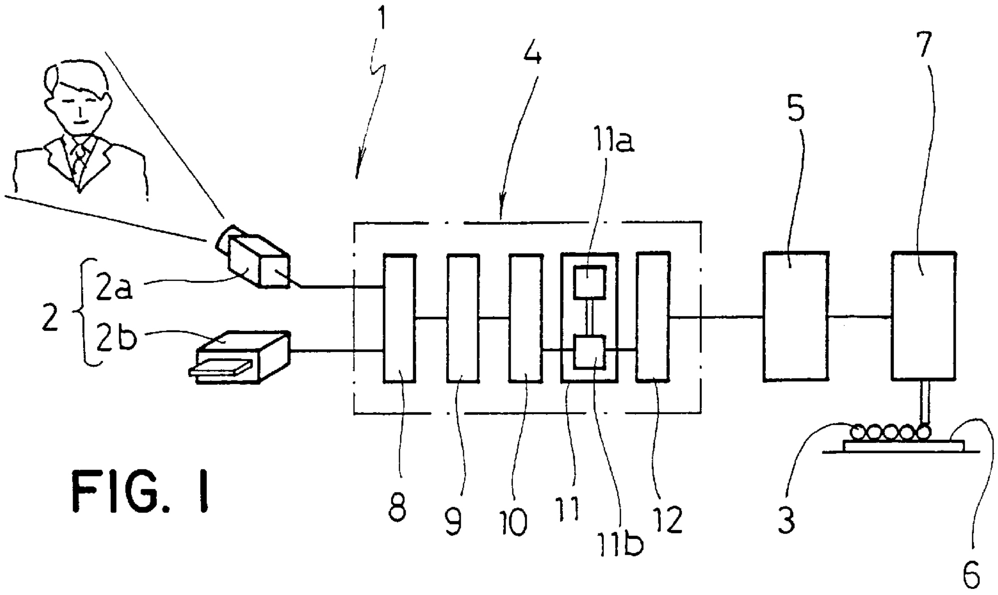
FIG. 1
FIG. 2
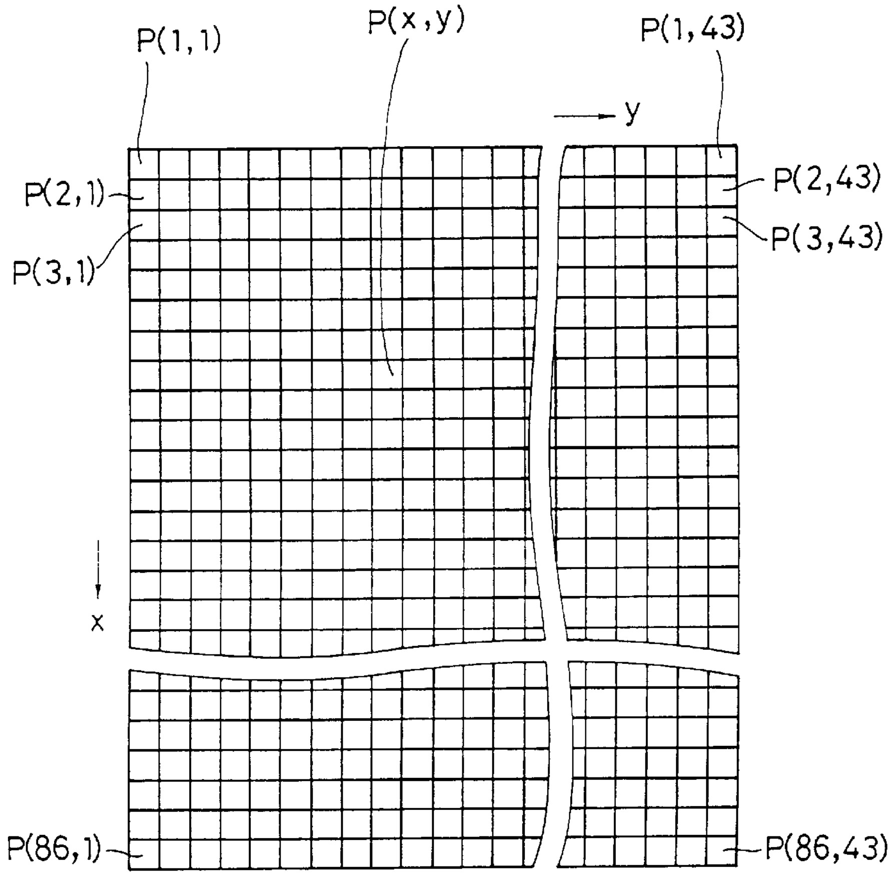

FIG. 12
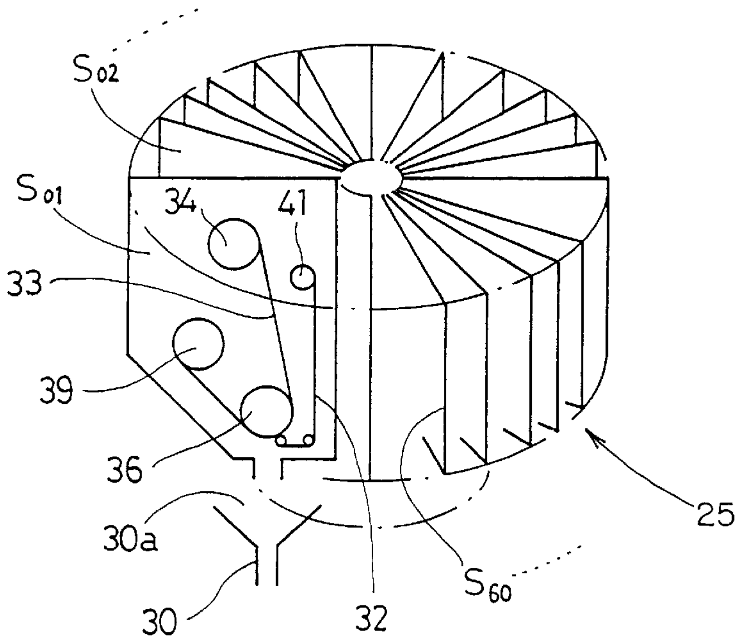
FIG. 13(a)
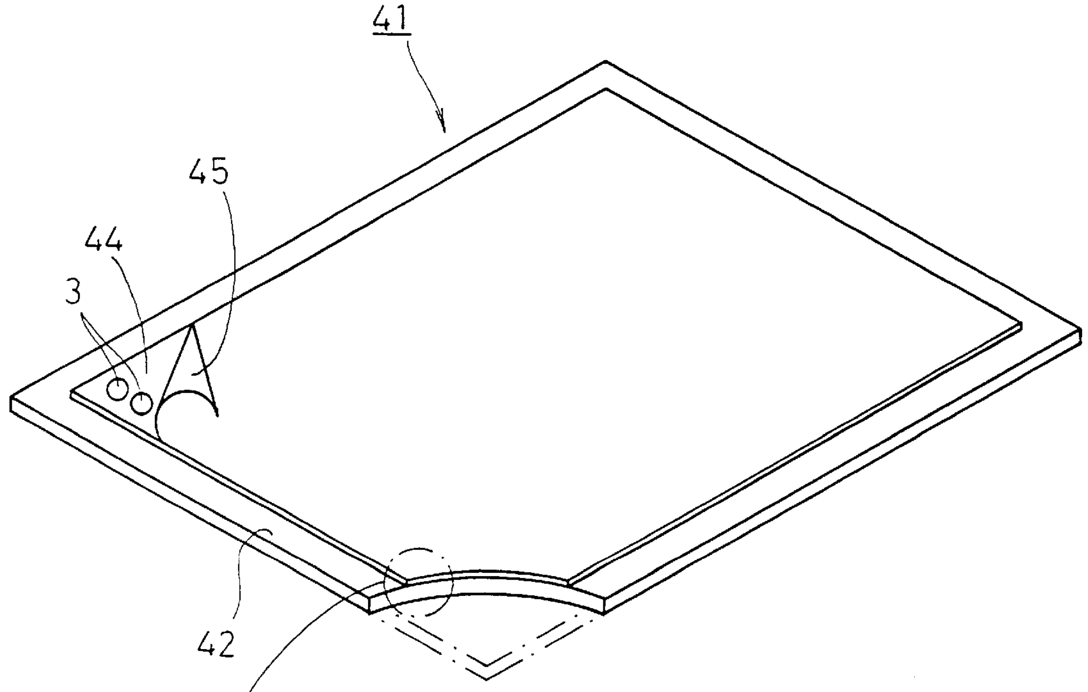
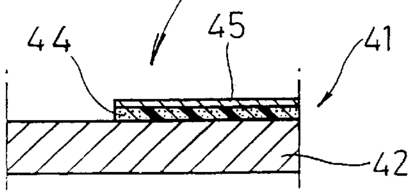
FIG. 13(b)

APPARATUS FOR MANUFACTURING A BEAD-INLAID PICTURE AND METHOD

BACKGROUND OF THE INVENTION 1. Field of the Invention

The present invention concerns a method of and an apparatus for manufacturing a bead-inlaid picture using, as a motif, various kinds of images such as patterns and pictures drawn on drawing paper, photographs or static images on CRT screens.

2. Related Art Statement

Most of mosaic articles that express patterns and pictures by inlaying various kinds of mosaic materials such as glass, ceramic, plastic, enamel, stone and wood are handicrafts prepared by manual works.

Among them, a bead-inlaid picture made by arranging glass beads (hereinafter simply referred to as beads) of various colors on a transparent glass plate as a drawing board is prepared by appending a color photograph taken, for example, from a landscape as a motif at the back of a transparent glass plate, selecting beads corresponding to the tones of the photograph as a mosaic material among beads of respective colors while seeing through the photograph from the side of the front surface of the glass plate, picking up the beads one by one by using a pincette, arranging them on the surface of the glass plate and securing by an adhesive.

However, if it is intended to express a pattern or a picture on a drawing board of 13 cm (width)×26 cm (length) by using beads, for example, each of 3 mm diameter, beads have to be arranged by the number in total of 43×86=3698 and beads of colors corresponding to the colors of the pattern or the picture have to be selected, so that it takes much time for preparation and needs a high cost.

Further, the quality and the manufacturing time of products differ greatly depending on the skill and the experience of workers and there is a problem that the quality and productivity of products are not constant.

OBJECT OF THE INVENTION

It is an object of the present invention to provide a bead-inlaid picture at high quality, with good productivity and at a reduced cost.

SUMMARY OF THE INVENTION

The foregoing object of the invention can be attained by a method of manufacturing a bead-inlaid picture by arranging beads of respective colors to complete a desired picture, wherein the method comprises:

(a) an image inputting step of inputting a desired original image as a motif of a bead-inlaid picture by an image input device, (b) an image processing step of dividing the inputted original image into each of pieces in a size equal with that of a bead, comparing numerical data obtained by quantizing the hue and the brightness for each of the pieces with an average density value in each of the pieces and numerical data obtained by quantizing the hue and the brightness for each of the beads, and replacing the numerical data for each of the pieces with a color code allocated to a bead having numerical data most approximate therewith and outputting the same, (c) a feeding step of feeding beads by a feeder storing the beads while dividing them on every color codes allocated to them respectively based on the color codes outputted by the image processing step, (d) an arranging step of arranging the beads fed from the feeder by an actuator in accordance with the arranged sequence for each of the pieces in the original image and, (e) a fusing step of fusing the arranged beads on a glass plate after the completion of the arranging step.

According to the present invention, an original image as a motif of a bead-inlaid picture inputted from the image input device is divided into each of pieces (picture elements) in a size equal with that of the bead, and a bead of a color most approximate to the color of each of the pieces is selected automatically, and the selected bead is fed automatically by the feeder and then arranged on the glass plate by the actuator in accordance with the arranged sequence of each of the pieces in the original image.

Then, the glass plate on which the beads are arranged is heated and the beads are fused onto the glass plate, by which the glass plate and the beads are firmly secured to complete a bead-inlaid picture.

BRIEF EXPLANATION OF THE ACCOMPANYING DRAWINGS

FIG. 1 is a block diagram illustrating an entire constitution of an apparatus for manufacturing a bead-inlaid picture according to the present invention:

FIG. 2 is an explanatory view illustrating a divided original image;

FIG. 12 is a schematic view illustrating a further example of the feeder;

FIG. 13 is a perspective view illustrating an example of a substrate for arranging beads used in the present invention;

Figure 15:
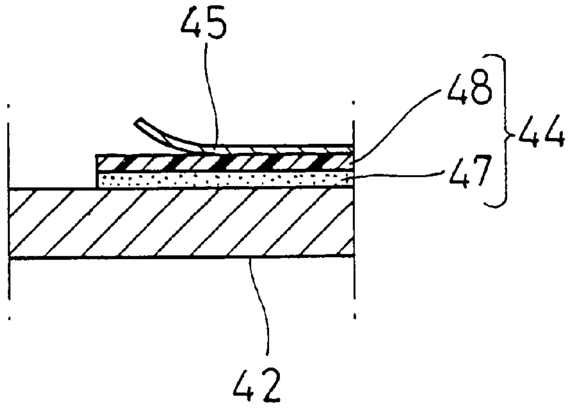
Figure 16:
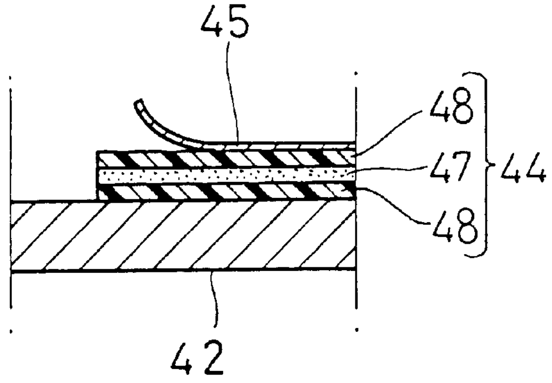

FIGS. 14(*a*)–14(*d*) are cross sectional views illustrating a method of manufacturing a bead-inlaid picture;

FIG. 15 is a fragmentary cross sectional view illustrating another example of a substrate for arranging beads; and FIG. 16 is a fragmentary cross sectional view illustrating a further example of the substrate.

DESCRIPTION OF THE PREFERRED EMBODIMENTS

The present invention will be explained by way of preferred embodiments with reference to the accompanying drawings.

First Embodiment

An apparatus 1 for manufacturing a bead-inlaid picture shown in FIG. 1 to FIG. 6 comprises an image input device 2 for inputting a desired original image as a motif of a bead-inlaid picture, an image processing device 4 for dividing the original image inputted by the image input device 2 into each of pieces P in a size equal with that of a bead 3 and outputting a color code on each piece P, a feeder 5 for feeding beads 3 allocated with color codes sequentially, and an actuator 7 for arranging the beads 3 fed from the feeder 5 on a glass plate 6 in accordance with the arranged sequence for each of the pieces P in the original image.

The image input device 2 usable in the present invention can include an image pick-up means 2*a* such as a CCD camera 2 a TV camera, a digital camera or a scanner in accordance with the arranged sequence for each of the pieces P in the original image, an image reproducing device 2*b* for reading out an original image recorded, for example, in a magnetic tape, a floppy disc, an optical disc or an opto-magnetic disc, and a key board or a mouse for key inputting an original image after preparing or processing on CRT of a personal computer.

In this case, in the image input device 2, optional processing can be applied, for example, correction of the color of an image taken into the CCD camera 2*a* or the like so as to put it closer to an actual color, or inversion into a complimentary color, replacement with an optional color or, further, deformation of an image.

The image processing device 4 comprises an image dividing device 9 for storing the original image inputted by the image input device 2 into a frame memory 8 and then dividing the same into pieces P(x, y) each in a size equal with that of the bead 3 as shown in FIG. 2, a color analyzing device 10 for replacing the hue and the brightness of each of the pieces P(x, y) with numerical data obtained by quantizing them with an average density value in each of the pieces P (x, y), a color designation device 11 for comparing the numerical data determined by the color analyzing device 10 with numerical data obtained by quantizing the hue and the brightness of the bead 3 and replacing the numerical data for each of the pieces P(x, y) with a color code allocated to a bead 3 having numerical data most approximate therewith, and a color code output device 12 for outputting each of color codes designated by the color designation device 11 as time sequential signals in accordance with the arranged sequence of each of the pieces P(x, y) in the original image or as pixel data containing a color code and positional data (x, y) for each of the pieces P.

In the color analyzing device 10, when the densities (brightness) of three primary color, G, R, B are represented respectively by 4 bits for instance, since the density comprises 16 gradations as shown in Table 1, the hue and the brightness for each of the pieces P(x, y) is analyzed into 16×16×16=4096 colors and outputted.

TABLE 1

| Numerical data (density/brightness) | | Bit data | | | |
|---|---|---|---|---|---|
| 0 | (dark) | 0 | 0 | 0 | 0 |
| 1 | ↑ | 0 | 0 | 0 | 1 |
| 2 | ↑ | 0 | 0 | 1 | 0 |
| 3 | ↑ | 0 | 0 | 1 | 1 |
| 4 | ↑ | 0 | 1 | 0 | 0 |
| 5 | ↑ | 0 | 1 | 0 | 1 |
| 6 | ↑ | 0 | 1 | 1 | 0 |
| 7 | ↑ | 0 | 1 | 1 | 1 |
| 8 | ↓ | 1 | 0 | 0 | 0 |
| 9 | ↓ | 1 | 0 | 0 | 1 |
| A | ↓ | 1 | 0 | 1 | 0 |

TABLE 1-continued

| Numerical data (density/brightness) | | Bit data | | | |
|---|---|---|---|---|---|
| B | ↓ | 1 | 0 | 1 | 1 |
| C | ↓ | 1 | 1 | 0 | 0 |
| D | ↓ | 1 | 1 | 0 | 1 |
| E | ↓ | 1 | 1 | 1 | 0 |
| F | (bright) | 1 | 1 | 1 | 1 |

When the number of colors for the beads is 60, the hue and the brightness of each of the pieces P(x, y) outputted as numerical data for 4096 colors are replaced in the color designation device 11 with a color code of the most approximate color among previously determined 60 colors.

In this case, the color designation device 11 comprises a color setting memory 11*a* for previously storing numerical data obtained by quantizing the hue and the brightness of the beads 3 of respective colors and color codes therefor by 60 colors, for example, as shown in Table 2 and a calculation device 11*b* for comparing the numerical data determined by the color analyzing device 10 with the numerical data stored in the memory 11*a* and replacing with a color code of a bead 3 having numerical data most approximate to the numerical data for each of the pieces P(x, y).

For example, if a color of a piece P(x, y) has numerical data representing the density of three primary colors G, R, B of "F, F, 1", and the numerical data of the bead 3 most approximate therewith is "F, F, 0", the numerical data of the piece P(x, y) is replaced with a color code "&HFF0" that represents "bright yellow".

TABLE 2

| | | Numerical data | | |
|---|---|---|---|---|
| Color Code | Color | G | R | B |
| &HFFF | bright white | F | F | F |
| . | . | . | . | . |
| . | . | . | . | . |
| . | . | . | . | . |
| &H111 | dark gray | 1 | 1 | 1 |
| &H000 | black | 0 | 0 | 0 |
| &HF00 | bright green | F | | |
| . | . | . | 0 | 0 |
| . | . | . | | |
| . | . | . | | |
| &H100 | dark green | 1 | | |
| &H0F0 | bright red | | F | |
| . | . | 0 | . | 0 |
| . | . | | . | |
| . | . | | . | |
| &H010 | dark red | | 1 | |
| &H00F | bright blue | | | F |
| . | . | 0 | 0 | . |
| . | . | | | . |
| . | . | | | . |
| &H001 | dark blue | | | 1 |
| &HFF0 | bright yellow | F | F | |
| . | . | . | . | 0 |
| . | . | . | . | |
| . | . | . | . | |
| &H110 | dark yellow | 1 | 1 | |
| &HF0F | bright pale blue | F | | F |
| . | . | 0 | . | |
| . | . | . | . | |
| . | . | . | | |
| &H101 | dark pale blue | 1 | | 1 |
| &H0FF | bright purple | | F | F |
| . | . | 0 | . | . |
| . | . | | . | . |

TABLE 2-continued

| Color Code | Color | Numerical data G | R | B |
|---|---|---|---|---|
| . | . | | . | . |
| &H011 | dark purple | | 1 | 1 |
| &H9F0 | orange | 9 | F | 0 |

In a feeder 5 using, for example, beads of 60 colors, columns $C_{01}$–$C_{60}$ for storing beads 3 while dividing them on every color codes are connected with a spiral shooter 13. An escapement 14 is attached to the lower end for each of the columns $C_{01}$–$C_{60}$ for sending only one bead 3 allocated with a relevant color code to the shooter 13 when a color code is outputted from the image processing device 4 FIG. 3.

Figure 3:
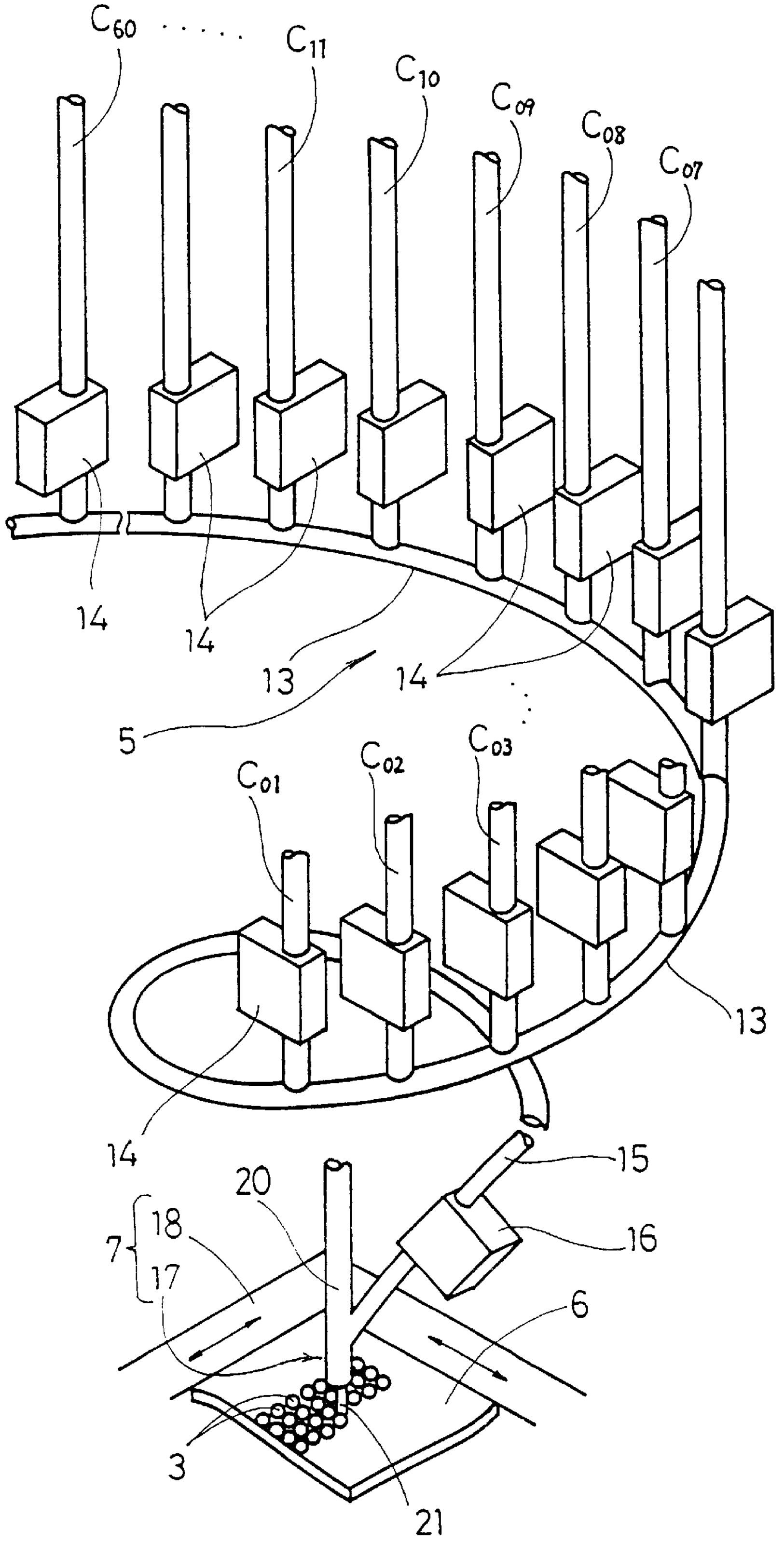
FIG. 3 is a perspective view illustrating an example of a feeder.
Figure 4:
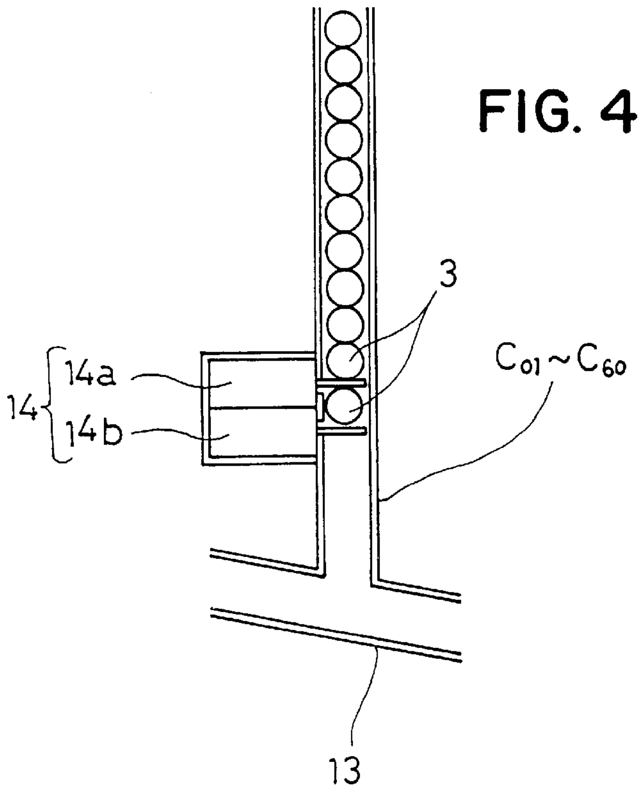
FIG. 4 is a cross sectional view illustrating a portion of the feeder.
Figure 5:
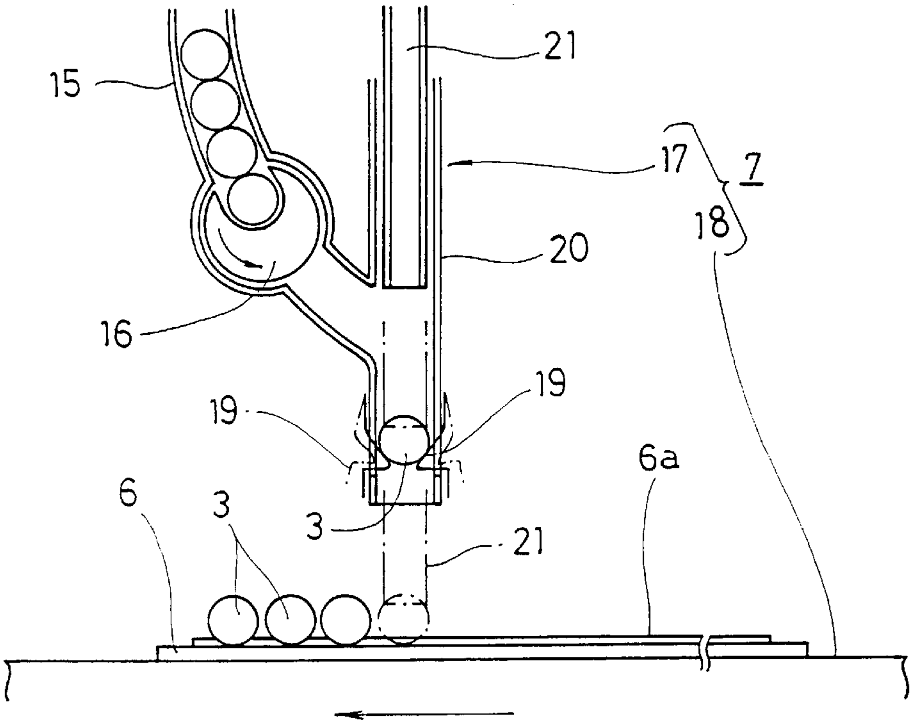
FIG. 5 is a cross sectional view illustrating a portion of an example of an actuator.

The escapement 14 has, for example, two stoppers 14*a*, 14*b* disposed one above the other being spaced by a diameter of the bead 3 and retractably in the column $C_{01}$–$C_{60}$ as shown in FIG. 4. Upon retracting the lower stopper 14*b* while protruding the upper stopper 14*a*, the bead 3 is dispensed by one. On the other hand, upon retracting the upper stopper 14*a* while protruding the lower stopper 14*b*, the bead is filled between each of the stoppers 14*a* and 14*b*.

Accordingly, when time sequential signals of a color code from the image processing device 4 is outputted, the escapement 14 in the column $C_{01}$–$C_{60}$ storing beads 3 allocated with the color code corresponding to the time sequential signal is actuated, and the bead 3 is dispensed in the sequence of the color into the shooter 13.

In a case where the size for each of the beads 3 is not uniform and beads of a large size exceeding an allowable tolerance are included, adjacent beads 3 may possibly be displaced or clogged in the shooter 13 when the large size bead 3 is inlaid. In such a case, a selection mechanism, for example, a sieve for selecting only those beads 3 of less than a predetermined size and dropping them into the columns $C_{01}$–$C_{60}$ may be disposed to the upper end for each of the columns $C_{01}$–$C_{60}$.

The actuator 7 comprises a magazine tube 15 for arranging and loading beads 3, 3, --- sent from the shooter 13 in the sequence of the color codes of the time sequential signals, an arranging mechanism 17 for arranging the beads 3, 3, --- sent one by one from the escapement 16 interposed in the magazine tube 15 on a glass plate 6 as a drawing board, and an X-Y table 18 for moving the glass plate 6 in an X-Y direction so as to arrange the beads 3 in accordance with the arranged sequence for each of the pieces P(x, y) in the original image and positioning the position Q(x, y) on the glass plate 6 corresponding to each of the pieces P(x, y) of the original image relative to the arranging mechanism 17.

The arranging mechanism 17 comprises a guide pipe 20 having a spring chuck 19 formed at the top end of the pipe for engaging the bead 3 dispensed from the magazine tube 15 and a vacuum pipe 21 disposed retractably so as to protrude from and retract into the top end of the guide pipe 20 for opening the spring chuck 19 and pushing out the bead 3 retained in the spring chuck 19 from the top end of the guide pipe 20.

Accordingly, when the vacuum pipe 21 is extended on the bead 3 engaged by the spring chuck 19, to adsorb the bead to the top end of the pipe, and then the vacuum pipe 21 is further extended, the spring chuck 19 is widened by the bead 3 adsorbed to the top end of the vacuum pipe 21 and the bead 3 is pushed out from the lower end of the guide pipe 20 and arranged on the glass plate 6 which is positioned therebelow.

Then, when the vacuum is interrupted and only the vacuum pipe 21 is retracted in the guide pipe 20, the bead 3 is arranged being positioned to a predetermined position.

The glass plate 6 as a drawing board has an adhesive layer 6*a* formed on the surface, for example, by coating an aqueous adhesive. The adhesive layer 6*a* is further covered with releasable paper, which is peeled off when the bead is secured on the X-Y table 18. Thus, the bead 3 is temporarily secured to the adhesive layer 6*a*.

Method of Manufacturing Bead-inlaid Picture

The apparatus for manufacturing a bead-inlaid picture according to the present invention is as has been described above and then a method of manufacturing a bead-inlaid picture will be explained.

For instance, in a case of manufacturing a bead-inlaid picture using beads of 60 colors each of 3 mm diameter, beads 3, 3, --- are at first stored previously on every color codes thereof into each of columns $C_{01}$–$C_{60}$ of the feeder 5.

At first, in the image inputting step, an image as a motif of a bead-inlaid picture is taken up and inputted by the image input device such as a CCD camera 2*a*.

Then, in the image processing step, image signals inputted by the image input device 2 are sent to and put to signal processing in the image processing device 4.

At first, the signals for the image are stored in the frame memory 8 and then the images are divided by the image dividing device 9 into each of the pieces P(x, y) of a size equal with that of the bead 3.

If a bead-inlaid picture, for example, of 13 cm (width)×26 cm (length) is to be made based on the inputted image, an image area for the bead-inlaid picture is divided into pieces of P(1, 1)–P(86, 43) in the number of: 43 (lateral)×86 (longitudinal)=3698.

Then, in the column analyzing device 10, the hue and the brightness for each of the pieces P(x, y) is replaced with numerical data quantized by an average density value in each of the pieces P(x, y).

Then, in the color designation device 11, the numerical data determined by the color analyzing device 10 is compared with the numerical data obtained by quantizing the hue and the brightness of the bead 3, and the numerical data for each of the pieces P(x, y) is replaced with a color code allocated to the bead 3 having the numerical data most approximate therewith.

When the color for each of the pieces P(x, y) of the original image is thus replaced with a predetermined color code by the color designation device 11, the color code output device 12 outputs the color code as time sequential signals in accordance with the arranged sequence for each of the pieces P(x, y) in the original image, or pixel data containing the color code and the positional data (x, y) for each of the pieces P in the original image.

Figure 6:
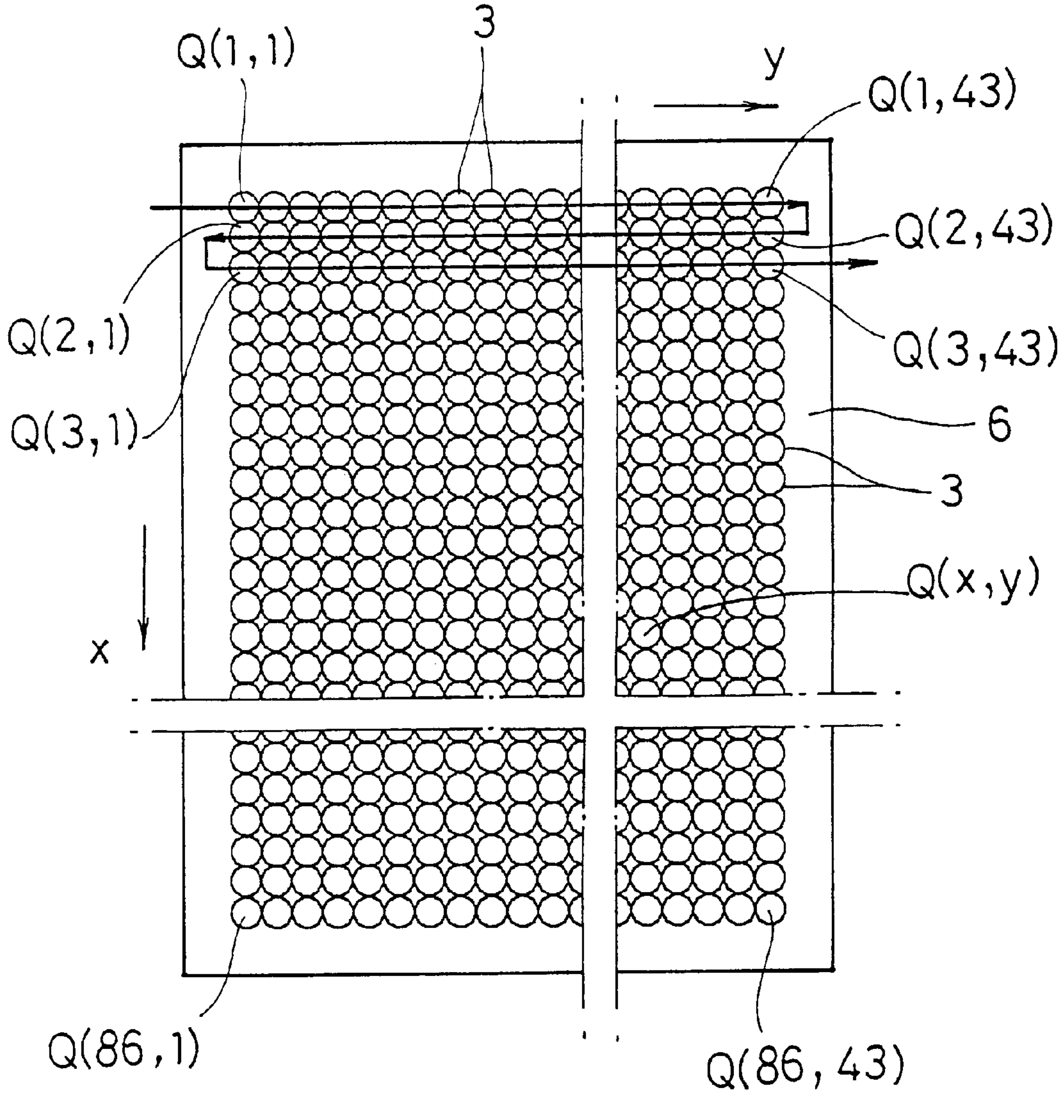
FIG. 6 is an explanatory view illustrating an operation of the actuator.
Figure 7:
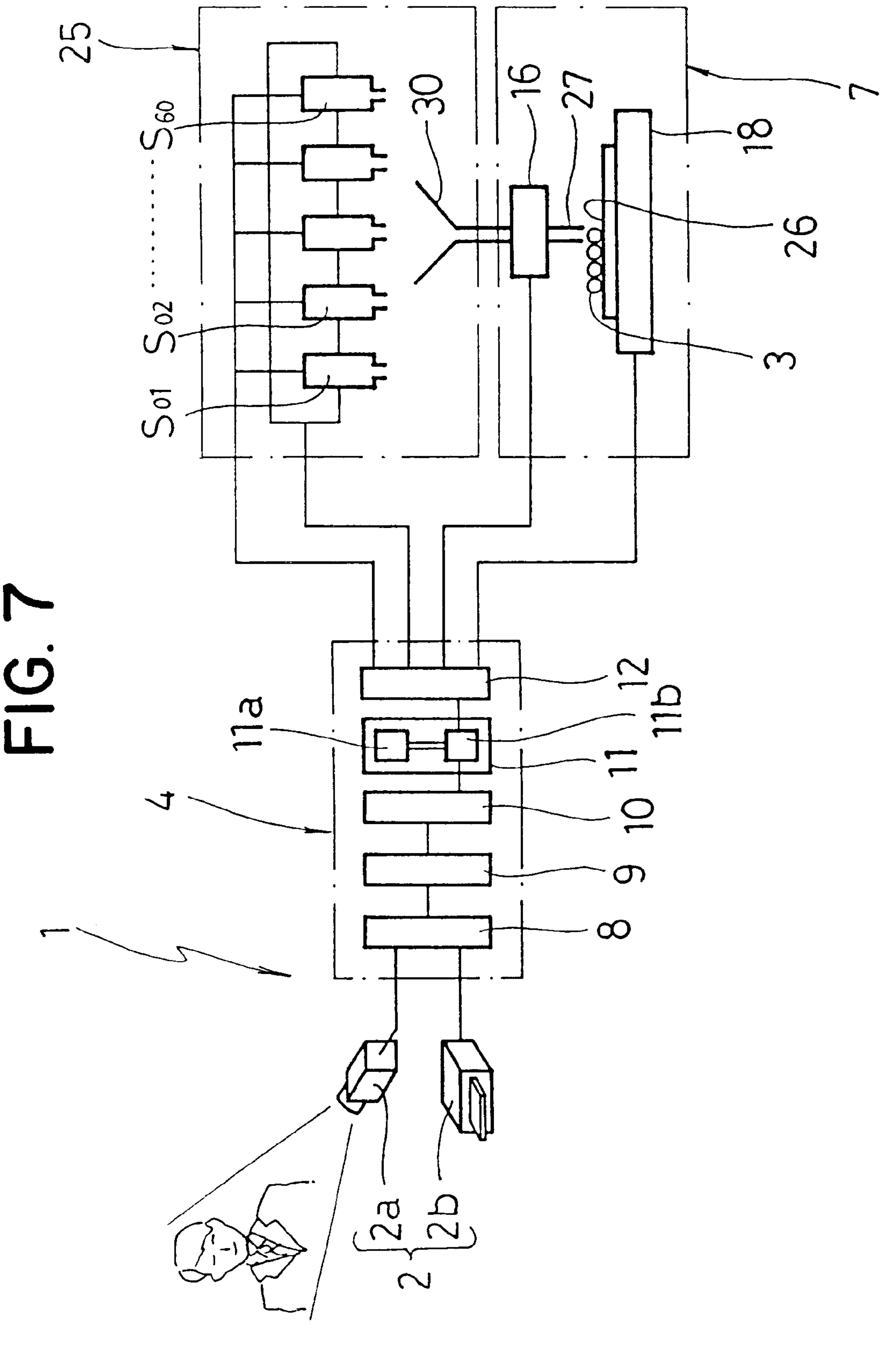
FIG. 7 is a block diagram illustrating an entire constitution of another apparatus for manufacturing a bead-inlaid picture according to the present invention.
Figure 8:
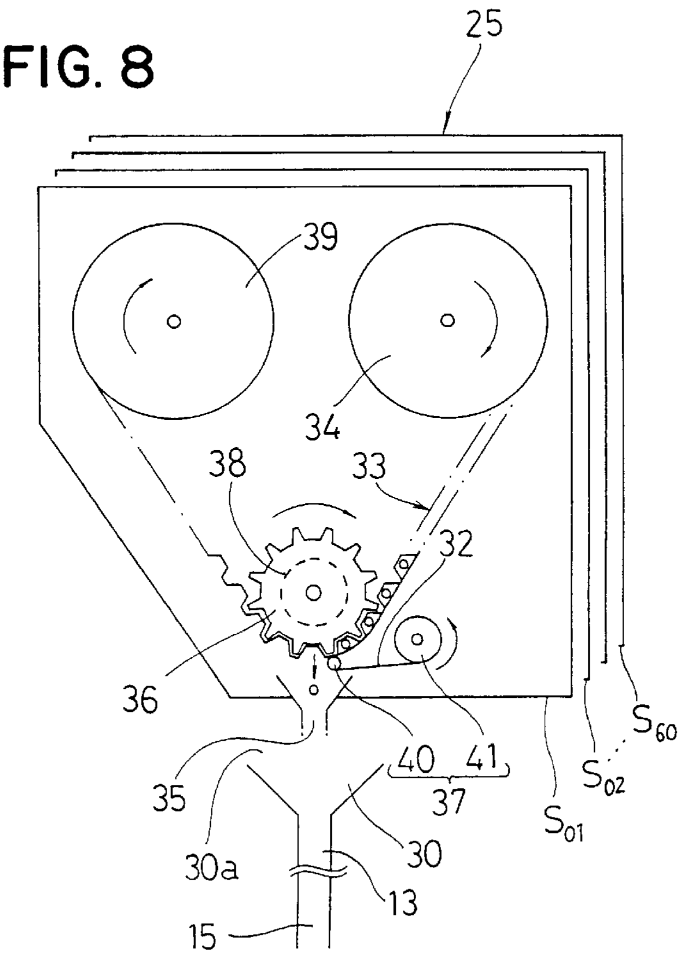
FIG. 8 is a schematic view illustrating a constitution of a feeder.
Figure 9:
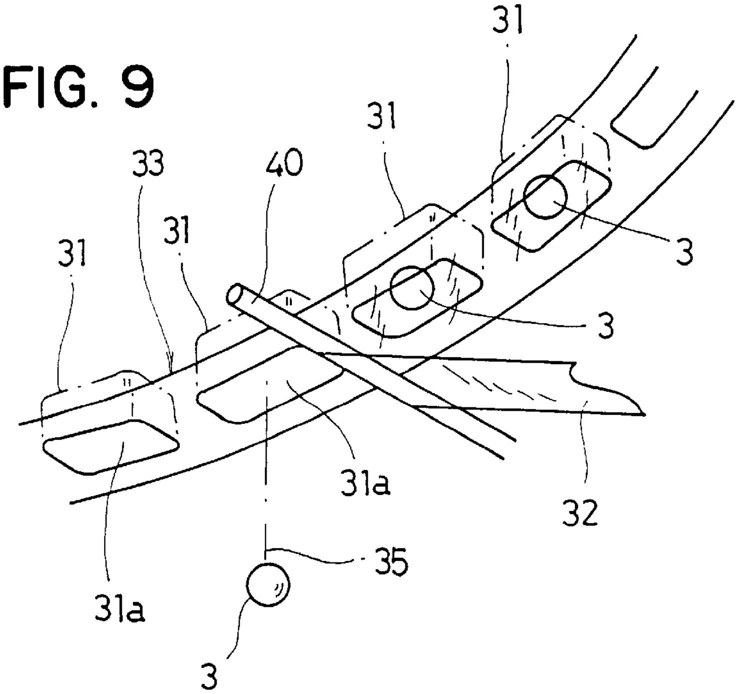
FIG. 9 is a perspective view illustrating a portion of the feeder.

In this case, if the actuator 7 is adapted to arrange the beads one by one while reciprocating rightwardly and leftwardly as shown in FIG. 6, the color code is outputted as time sequential signals in accordance with the arranged sequence. For example, the color codes are outputted sequentially, for example, in the sequence of the pieces P(1, 1)–P(1, 43) of the original image from the left to the right for the first row, P(2, 43)–P(2, 1) of the original image from the right to the left for the second row and, further, P(3, 1)–P(3, 43) of the original image from the left to the right for the third row.

In the feeding step, when the time sequential signals for the color codes are outputted from the color code output device 12, escapements 14 disposed to the columns $C_{01}$–$C_{60}$ of the feeder 5 are successively operated in accordance with the sequence of the color codes, drop the beads 3 of 60 colors in the sequence of the color codes into the shooter 13, and the beads 3 are arranged in the magazine 15 in accordance with the sequence.

In the arranging step, the actuator 7 is actuated at the instance the beads 3 for one row (for example, by the number of 43) are arranged in the magazine tube 15 and the X-Y table 18 is moved at first and the position Q(1, 1) of the glass plate 6 corresponding to the piece P(1, 1) of the original image is situated just beneath the guide pipe 20.

Then, when the escapement 16 of the magazine tube 15 is operated, the bead 3 at the top is separated by one and sent into the guide pipe 20 and stopped by the spring chuck 19 formed at the top end of the pipe.

Then, when the vacuum pipe 21 is extended relative to the bead 3, the bead 3 is adsorbed to the top end thereof. Then, when the vacuum pipe 21 is further extended in this state, the spring chuck 19 is widened by the bead 3 attracted by the top end by the vacuum pipe 21, the bead 3 is pushed out from the lower end of the guide pipe 20 and then adhered at the position Q(1, 1) of the glass plate 6 corresponding to the piece P(1, 1) of the original image.

Then, when suction by the vacuum pipe 21 is interrupted and the vacuum pipe 21 is retracted into the guide pipe 21, the bead 3 is temporarily secured to the adhesive layer 6*a* on the surface of the glass plate 6.

Then, the X-Y table 18 is moved and the position Q(1, 2) of the glass plate 6 corresponding to the piece P(1, 2) of the original image is positioned just beneath the guide pipe 20. In the course of this movement, when the bead 3 situated at the leading end of the magazine tube 15 is dispensed by one from the escapement 16, caused to stand-by in a state retained by the spring chuck 19 of the guide pipe 20 and, when the vacuum pipe 21 is extended at the instance the glass plate 60 is positioned, the bead 3 adsorbed to the top end of the vacuum pipe 21 is temporarily secured to the position Q(1, 2) of the glass place 6 corresponding to the piece P(1, 2) of the original image.

In this way, as the glass plate 6 is positioned by the X-Y table 18 and the beads 3 are arranged sequentially, beads 3, 3, --- fed sequentially from the feeder 5 are arranged in accordance with the arranged sequence of each of the pieces P(x, y) in the original image on the corresponding position Q(x, y) of the glass plate 6, and the beads 3, 3, --- are arranged as per the original image taken-up by the image input device 2.

Since the beads 3, 3, --- are merely secured temporarily on the adhesive layer 6*a* formed by coating the aqueous adhesive to the surface of the glass plate 6, after the beads 3 have been arranged to the positions Q(x, y) on the glass plate 6 corresponding to all of the pieces P(x, y) of the original image, they are put into a heating furnace (not illustrated) and heated to a temperature near the melting point of glass, and the beads 3, 3, --- are fused to the glass plate 6 to complete a bead-inlaid picture.

The beads 3, 3, --- are made of such a material as having a melting point lower than that of the glass plate 6 so that they are fused before the melting of the glass plate 6, and they are made of such a material as having linear expansion coefficient closer with each other so that cracking may not be formed in the course of cooling.

Further, for reliably preventing dropping of the bead 3, another glass plate may be put over the beads 3 arranged on the glass plate 6 and the beads may be heated being put between the two sheets of glass and fused to the upper and lower glass plates.

Furthermore, the overlaid glass plate having a melting point lower than that of the bead 3 is heated, glass may be cast into the gaps between the beads 3, 3, --- by heating.

In the foregoings, while explanations have been made to a case of manufacturing a bead-inlaid picture using glass beads, a mosaic picture can be made instead of the glass bead-inlaid picture by the apparatus of the same constitution by using mosaic materials other than the glass beads.

In the case of using the glass beads, since the shape is spherical, there is no requirement of taking the directionality of the bead into a consideration and they can be arranged irrespective of the surface and rear face of them. Accordingly, this provides an advantageous merit capable of simplifying the constitution of the feeder 5 and the actuator 7.

Further, since the surface of each of the beads constituting the bead-inlaid picture is spherical, the picture can be observed distinctively not only in a case of observing the bead-inlaid picture just from the front but also in a case of observing the picture obliquely since there always exists a plane on the bead that is in perpendicular to the visual axis Furthermore, when the bead-inlaid picture is made by using a transparent colored glass material, an decorative effect like that of stained glass can also be obtain by illuminating light from the back of the picture.

As mosaic materials other than the glass beads, optional mosaic materials such as plastics and ceramics can also be adopted and the drawing board is not restricted only to the glass plate but any material such as a lithographic plate may also be used.

Further, the feeder 5 is not restricted only to the embodiment of connecting each of columns $C_{01}$–$C_{60}$ to one shooter 13 but optional means can be adopted. For instance, columns $C_{01}$–$C_{06}$ each having an escapement 14 at the lower end may be arranged as a matrix above the X-Y table 18, and the escapements 14 for the columns $C_{01}$–$C_{06}$ allocated with the color codes may be actuated in accordance with the time sequential signals of the color codes outputted from the image processing device 4 and beads 3 of predetermined colors may be dropped from the lower ends of the columns $C_{01}$–$C_{60}$ respectively.

In this case, the actuator 7 comprises an X-Y table 18 for controlling such that each of the positions on the glass plate 6 as the substrate corresponding to each of the pieces P(x, y) in the original image is positioned just beneath each of the columns $C_{01}$–$C_{60}$ on which the bead 3 is dropped.

Further, the present invention is not restricted only to the embodiment of outputting the color code as the time sequential signals. Alternatively, it may be constituted to form pixel data containing color codes and positional data for each piece, output the pixel data on every color code, and while controlling the position of the X-Y table 18 based on the positioning data, arrange the beads in the sequence of colors, for example, by at first arranging red beads 3 at predetermined positions and then arranging blue beads 3 at predetermined positions.

Second Embodiment

Apparatus for manufacturing a bead-inlaid picture shown in FIG. 7 to FIG. 12 adopt different types of feeders from the first embodiment.

Portions in common with those in FIG. 1 to FIG. 6 carry the same reference numerals for which detailed explanations will be omitted.

A feeder 25 in this embodiment comprises, in a case of using beads, for example, of 60 colors, bead distribution mechanisms $S_{01}$–$S_{60}$ for 60 colors supplying beads 3 of respective colors, and a hopper 30 for feeding beads 3 of respective colors dropped from a bead discharge port 35 for each of the bead distribution mechanisms $S_{01}$–$S_{60}$ to the actuator 7.

The hopper 30 is disposed at a predetermined position, each of the beads distribution mechanisms $S_{01}$–$S_{60}$ is arranged such that respective beads discharge ports 35 are arranged in a row, and each of the beads discharge ports 35 is disposed movably so as to be situated above the opening 30*a* of the hopper 30.

Any of known means can be adopted for each of the moving means and positioning means of the bead distribution mechanisms $S_{01}$–$S_{60}$.

Each of the bead distribution mechanisms $S_{01}$–$S_{60}$ comprises a feed reel 34 around which a bead distribution tape 33 is wound, in which recesses 31 each containing one bead 3 are formed continuously each at a predetermined distance, and an opening 31*a* of the recess 31 containing one bead 3 is covered with a film tape 32; a sprocket 36 along which the bead distribution tape 33 fed from the feed reel 34 is wound such that the recess 31 opens downwardly at a position opposing to the bead discharge port 35, a winding mechanism 37 for winding and pulling the film tape 32 that covers the opening 31*a* of the recess 31 in the direction peeling from the bead distribution tape 33 at a position for the bead discharge port 35; an intermittent feed mechanism 33 for feeding and dispensing the bead distribution tape 33 wound around the feed reel 34 allocated with the color code corresponding to each of time sequential signals based on the time sequential signals of the color codes output from the image processing device 4 one by one for the recess 31; and a take-up reel 39 for taking-up the intermittently fed bead distribution tape 33.

Each of the bead distribution mechanism $S_{01}$–$S_{60}$ is adapted to move the bead discharge port 35 for each of bead distribution mechanism $S_{01}$–$S_{60}$ allocated with the color codes based on the color code outputted from the image processing device 4, so as to situate just above the hopper 30, intermittently feed the bead distribution tape 33 while situating the bead discharge port 35 above the opening 30*a* of the hopper 30 and drop the bead 3 into the hopper 30.

The intermittent feed mechanism 38 comprises, for example, with a pulse motor for feeding the teeth of the sprocket 36 one by one. In a case where intermittent feed perforations are formed each at a predetermined distance (for example at a pitch equal with that of the recess 31) along the longitudinal direction of the bead distribution tape 33, a gear (not illustrated) may be engaged to the intermittent feed perforation and the feed gear may be rotated each time at a predetermined angle, for example, by a pulse motor.

Further, the winding mechanism 37 for winding and pulling the film tape 32 in the direction of peeling from the bead distribution tape 33 comprises a rod 40 for winding the film tape 32 disposed in contact with the circumferential edge and substantially in parallel with a rotational shaft of the sprocket 36, and a take-up reel 41 for taking up the film tape 32 in synchronization with intermittent feeding of the bead distribution tape 33.

Accordingly, when the time sequential signals of the color codes from the image processing device 4 are outputted, the bead distribution mechanisms $S_{01}$–$S_{60}$ for feeding the beads 3 allocated with the color codes corresponding to the time sequential signals respectively are actuated, the bead distribution tape 33 is fed by one frame, and the bead 3 is dropped into the hopper 30 in the sequence of the colors and then fed by way of the shooter 13 to the actuator 7.

It is desirable that a detection means (not illustrated) is disposed to each of the bead distribution mechanisms $S_{01}$–$S_{60}$ for detecting absence of the beads 3 or reduction for the remaining amount of them.

For this purpose, an optical sensor for optically detecting the absence or presence of the bead distribution tape 33 wound between the feed reel 34 and the sprocket 36, or a tension pulley for detecting the absence or presence of the tape 33 depending on the tape tension is used for instance and adapted to blow an alarm, light-up an alarming lamp or temporarily stop the bead-inlaid picture manufacturing apparatus 1 when the detection signal is outputted.

Then, when the residual amount of the bead 3 of any color is reduced, the apparatus 1 for manufacturing the bead-inlaid picture is stopped temporarily and an alarm lamp for the bead distribution mechanism $S_{01}$–$S_{60}$ for the color is lit.

Then, an empty feed reel 24, the spent bead distribution tape 33, as well as the take-up reels 39 and 41 for taking up the spent bead distribution tape 33 and the film tape 32 are detached and a feed reel 34 having not yet used bead distribution tape 33 wound therearound is mounted.

Further, when empty take-up reels 39 and 41 are attached, the bead distribution take 33 dispensed from the supply reel 34 is wound along the sprocket 36 with the top end being wound around the take-up roll 39, the film tape 32 peeled from the distribution 33 is wound along the rod 44 and the top end being wound around the take-up reel 41 and then the apparatus 1 for manufacturing the bead-inlaid picture is restarted, the beads 3 are arranged continuously.

The actuator 7 comprises a magazine tube 15 for arranging and loading the beads 3, 3 --- fed by the shooter 13 in the sequence of the color codes of the time sequential signals; a nozzle 27 for successively arranging beads 3, 3, --- sent one by one from the magazine tube 15 by the escapement 16 to each of partitioned square areas 26*a* formed on the arrangement plate 26, and an X-Y table 18 for moving the arrangement plate 26 in the X-Y direction so as to arrange the beads 3 in accordance with the arranged sequence for each of the pieces P(x, y) in the original image and positioning the position Q(x, y) on the arrangement plate 26 corresponding to each of the pieces P(x, y) of the original image.

That is, the sequence of the beads 3 loaded in the magazine tube 15 is made equal with the sequence of the beads 3 arranged on the arrangement plate 26 by the actuator 7, and the escapement 16 of the actuator 7 is operated after moving the X-Y table 18 such that the position Q(x, y) on the arrangement plate 26 corresponding to each of the pieces P(x, y) of the original image is positioned to the nozzle 27.

Thus, beads 3 arranged in the magazine tube 15 in accordance with the arranged sequence of each of the pieces P(x, y) in the original image are dispensed from the top end of them and disposed reliably on the position Q(x, y) on the arrangement plate 26 corresponding to each of the pieces P(x, y) of the original image.

In this case, it is preferred that the beads 3 is fed from each of the beads distribution mechanisms $S_{01}$–$S_{60}$ substantially at the same time interval as that for dropping and arranging the beads 3 from the nozzle 27 on the arrangement plate 26 so that the required number of beads 3 are always loaded in the magazine tube 15.

Then, when the beads 3 have been arranged completely at the positions Q(x, y) of the arrangement plate 26 corresponding to all of the pieces (x, y) of the original image, a glass plate coated at one surface with an adhesive is put over the arrangement plate 26, the adhesive surface is urged to the beads 3 to temporarily secure the beads 3 to the glass plate. In this state, the arrangement plate 26 is detached with the glass plate on the lower side and then they are put into a heating furnace (not illustrated) and heated to a temperature near the melting point of glass, by which the beads 3, 3, --- are fused to the glass plate to complete a bead-inlaid picture.

In this case, when the beads 3, 3, --- arranged on the arrangement plate 26 are transferred to the glass plate, since they are turned upside to down, the beads 3, 3 --- are arranged in a state with the original image taken by the imaging input device 2 being reversed with respect to the right to left direction. Accordingly, if the original image inputted by the image input means 2 is outputted from the image processing device 4 in a state reversed with respect to the right-to-left direction, a picture as per the original image is completed as a bead-inlaid picture.

In the foregoings, explanations have been made to a case of arranging the beads 3, 3, --- on the arrangement plate 26 in which partitioned square areas 26*a* are formed, the present invention is not restricted only thereto but the beads 3, 3, --- may be arranged directly on the glass plate or the like having an adhesive coated thereon.

Figure 10:
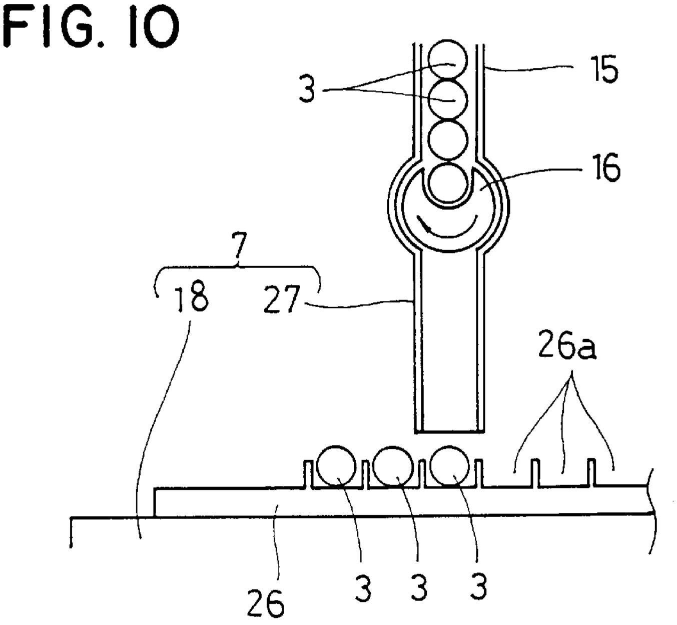
FIG. 10 is a cross sectional view illustrating a portion of an actuator.

Further, the actuator 7 is not restricted to that shown in FIG. 10, but any optional constitution may be adopted so long as it has a mechanism of dropping the beads 3 one by one in a state of positioning the arrangement plate 26 or the glass plate.

For example, as has been explained above, in a case of fixing the hopper 30 of the feeder 25 to a predetermined position, if the bead 3 is arranged to a predetermined position on the arrangement plate 26 on every time the bead 3 is dropped from the bead discharge port 35, it may suffice that the actuator 7 only has a nozzle 27 in continuous with the shooter 13 and a X-Y table 18, and the magazine tube 15 for arranging and loading the beads 3, 3, --- in the sequence of the color codes of the time sequential signals, and the escapement 16 for feeding the beads 3 in the magazine tube 15 one by one from the top end thereof may be saved optionally.

The feeder 25 has been explained to a case of disposing the hopper 3 at a predetermined position and moving each of the bead $S_{01}$–$S_{60}$ to the hopper 30. However, the present invention is not restricted only thereto but it may be constituted into such an embodiment as fixing each of bead distribution mechanisms $S_{01}$–$S_{60}$, and moving the hopper 30 such that the opening 30*a* thereof situates below the bead discharge port 35 of each of the bead distribution mechanisms $S_{01}$–$S_{60}$.

However, it is necessary in this case that the hopper 30 is previously moved to just beneath the bead discharge port 35 before the bead 3 is dropped from the bead discharge port 35 of each of the bead distribution mechanisms $S_{01}$–$S_{60}$ allocated with the color code based on the color code outputted from the image processing device 4.

Figure 11:
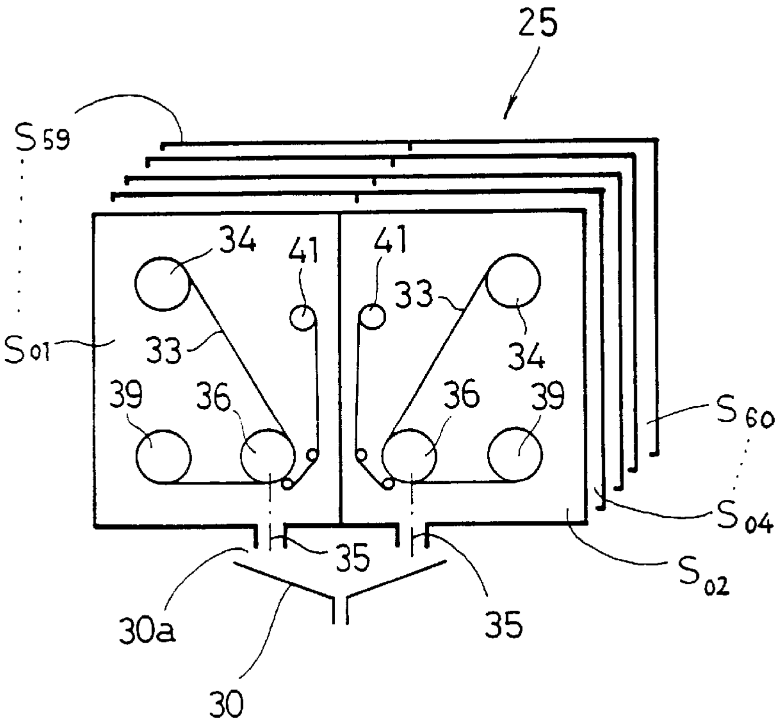
FIG. 11 is a schematic view illustrating another example of the feeder.
Figure 14A:
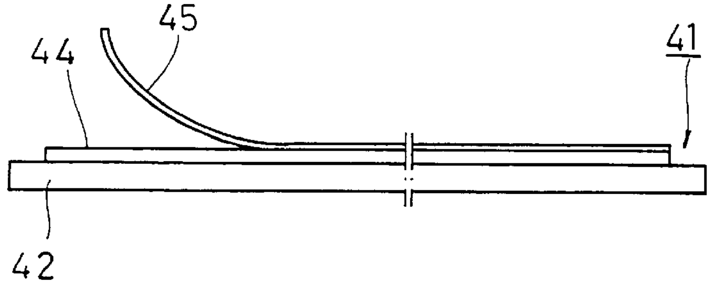
Figure 14B:
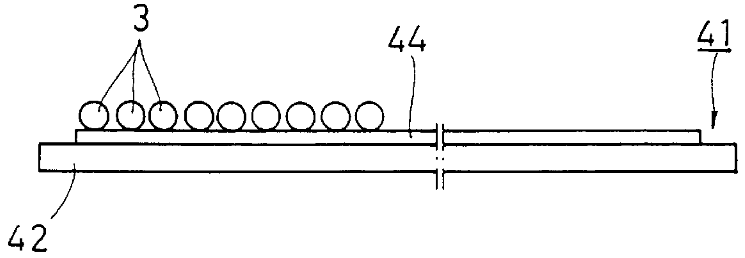
Figure 14C:
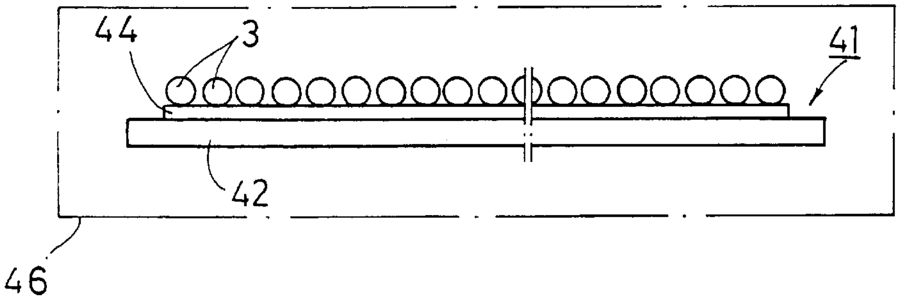
Figure 14D:
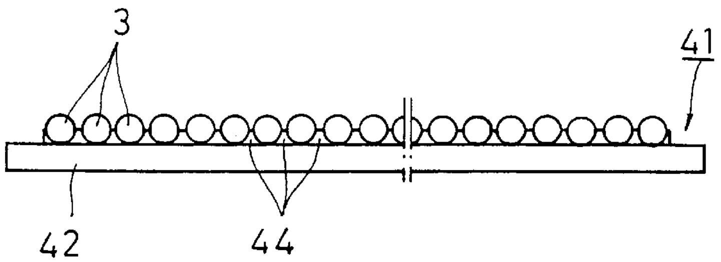

Further, the feeder 25 is not restricted to a case of arranging each of the bead distribution mechanisms $S_{01}$–$S_{60}$ in one row but it may be arranged in two rows as shown in FIG. 11, or may be arranged such that the beads discharge ports 35 situates in a circular form as shown in FIG. 12.

In any of the cases, it may suffice that beads 3 can be discharged selectively from each of the bead distribution mechanisms $S_{01}$–$S_{60}$, by moving the bead distribution mechanisms $S_{01}$–$S_{60}$ to the hopper 30, moving the hopper 30 to the bead distribution mechanisms $S_{01}$–$S_{60}$ or moving both of them.

Furthermore, in a case of opposing the bead discharge ports 35 for all of the beads distribution mechanisms $S_{01}$–$S_{60}$ to the hopper 30 by forming the opening 30*a* of the hopper 30 flat or by using a plurality of hoppers 30, the beads 3 of respective colors can be fed to the actuator 7 without moving the bead distribution mechanisms $S_{01}$–$S_{60}$ or the hopper 30.

Bead Arrangement Substrate

Further, FIG. 13 is a perspective view illustrating a bead arrangement substrate used for the method and the apparatus of the present invention.

A bead arrangement substrate 41 comprises a heat resistant substrate main body 42 such as a glass plate and a bead fixing layer 44 formed on the surface of the substrate main body having an adhesive strength of temporarily securing the beads 3 at a room temperature and softened or melted at a temperature lower than the softening point of the glass material and higher than the room temperature.

Desirably, the substrate main body 42 is provided with heat resistivity to endure temperature higher than the temperature at which the bead 3 is fused and, preferably, the heat resistant temperature is selected to a temperature higher than the softening point of the bead 3.

In a case of using a glass plate for the substrate main body 42, the softening point is selected higher than the temperature at which the bead 3 is fused thereby ensuring heat resistivity.

Further, the bead fixing layer 44 is formed for example by dispersing, into an adhesive, a glass powder of low softening point lower than that of the glass material constituting the bead 3 and fusing the bead 3 at a temperature higher than the softening point. If required, the surface of the bead fixing layer 44 is covered by releasing paper 45 or a releasing film for preventing the surface of the bead fixing layer 44 from oxidation, denaturation and drying.

The adhesive used for the bead fixing layer 44 is selected from materials that are eliminated by burning, thermal decomposition or evaporation at a temperature lower than the softening point of the low softening point glass powder and, for example, can include those organic binders such as a mixture of isoamyl acetate and 1 to 1.2% of nitrocellulose, a mixture of butyl carbitol acetate and 2–5% of nitrocellulose, isopropyl alcohol, hydroxypropyl cellulose and solutions of various kinds of adhesive organic polymeric materials.

Further, it is desirable that the material constituting the substrate main body 42, the glass material for the bead 3 and the low softening point glass powder glass contained in the bead fixing layer 44 have heat expansion coefficients substantially equal with each other.

For example, in a case of using a glass plate for the substrate main body 42, a glass material having a linear expansion coefficient of $92\times10^{-7}/°$ C. and a softening point of 740° C. is used for the glass plate, a glass material having a linear expansion coefficient of $93\times10^{-7}/°$ C. and a softening point from 560 to 620° C. is used for the bead 3, and a glass powder having a softening point of 440° C., a working point of 500° C. and a linear expansion coefficient of $97\times10^{-7}/°$ C. is used as the low melting point glass powder contained in the bead fixing layer 44.

Then, in a case of manufacturing a bead-inlaid picture by using the bead arrangement substrate 41 thus formed, release paper 45 is at first peeled to expose the bead fixing layer 44, the bead arrangement substrate 41 is supported substantially in a horizontal state as shown in FIG. 14(*a*), and then beads 3 of respective colors as picture elements in the bead-inlaid picture are arranged on the arrangement substrate 41 in accordance with a predetermined motif as shown in FIG. 14(*b*), by using the apparatus 1 for manufacturing the bead-inlaid picture shown in FIG. 1–FIG. 12.

Since the bead fixing layer 44 formed on the surface of the arrangement substrate 41 is adhesive, the beads 3 are secured temporarily when they Are placed on the arrangement substrate 41 and the thus arranged beads are not tumbled even when vibrations or shocks are applied to some extent or the arrangement substrate 41 is inclined.

Then, as shown in FIG. 14(*c*), the arrangement substrate 41 after completion of arrangement for the beads 3 is entered into an electric furnace 46 and heated to a working point (500° C.) which is somewhat higher than the softening point of the low softening point glass powder dispersed in the bead fixing layer 44. In this case, since the beads 3 are temporarily secured on the arrangement substrate 41, the beads are neither tumbled nor detached from the arrangement substrate 41 when the arrangement substrate 41 is entered into the electric furnace 46.

Then, since the temperature for the working point is lower than the heat resistant temperature of the substrate main body 42 and the softening point of the glass material for the bead 3, the low softening point glass powder is softened before softening of the bead 3 and the beads 3 and the substrate main body 43 are fused to each other by way of the fixing layer 44 as shown in FIG. 4(*d*) and, meanwhile the adhesive is eliminated by burning, thermal decomposition or evaporation till the temperature is reached.

In this case, if the bead arrangement substrate 41 is supported accurately in a horizontal state in the electric furnace 46, even if the adhesive of the fixing layer 44 is eliminated and the layer loses its adhesiveness, the beads 3 are not tumbled on the arrangement substrate 41 unless external force is exerted.

Further, since the linear thermal expansion coefficients are substantially equal between each of the materials constituting the substrate main body 42, the glass material forming the beads 3 and the low melting glass powder used for the bead fixing layer 44, neither cracking nor chipping is caused upon heating and cooling.

Subsequently, strains resulted to the substrate main body 42 and the like are removed by gradual cooling and the bead-inlaid picture as the products is taken out of the electric furnace 46.

The thus formed bead-inlaid picture has an appearance as if the beads 3 were fused directly to the substrate main body 42 with no residue of the adhesive or the like, and all beads 3 of respective colors can surely be fused to the substrate main body 42 even if their softening points are different due to the difference of the coloring materials incorporated in the beads 3, so that the beads are not detached by incomplete fusion and a fine finished state can be attained.

Further, bead-inlaid pictures of different feelings can be prepared, as well as the beads 3 can be fused more reliably to the arrangement substrate 41, if required, by fusing the beads 3 to each other, urging the beads 3 to the arrangement substrate 41 to such an extent that the beads 3 are crushed into a flat shape and, further, by melting the beads 3 to such an extent that the original shape of the beads 3 is no more retained by heating them to a temperature higher than the softening point of the beads 3.

The bead fixing layer 44 is not restricted only to those described above but, for example, water glass may be used for providing adhesion to temporarily secure the beads 3 at a room temperature and a low softening point glass powder may be dispersed in the water glass.

Further, the bead fixing layer 44 may comprise, as shown in FIG. 15, a two-layered structure having a heat fusing layer 47 made, for example, of low melting point glass that softens/melts at a temperature lower than the softening point of the glass plate constituting the beads 3 and at a temperature higher than the room temperature, and an adhesive layer 48 formed on the surface for temporarily securing the beads 3 at a room temperature in which the adhesive layer 48 is comprised of an adhesive eliminated by burning, thermal decomposition or evaporation at a temperature lower than the softening point/melting point of the heat fusion layer 47, or a three-layered structure, as shown in FIG. 16, in which an adhesive layer 48, a heat fusion layer 47 and an adhesive layer 48 are laminated in three layers on the substrate main body 42.

Further, the glass material for constituting the bead 3 and the softening point glass powder used for the bead fixing layer 44 are not restricted only to those described above but any glass material can be used for each of them so long as the softening point of the low softening point glass powder is selected to lower than the softening point of the glass material constituting the bead 3.

Furthermore, the substrate main body 42 is not restricted only to the glass plate, but any material, for example, ceramics such as alumina ceramics, porcelains, metals and alloys can be used so long as they have such heat resistance as capable of withstanding a temperature for fusing the bead 3. Further, the shape is not restricted to a plate-like shape but any shape may be used.

In any of the cases it is preferred to select them such that the linear expansion coefficients of the substrate main body 42, the bead 3, and the low softening point glass powder contained in the bead fixing layer 44 are substantially equal with each other.

As has been described above, according to the present invention, since the beads of respective colors can be arranged fully automatically as per the original image based on the image taken-up by the image inputting device, it has an excellent effect that any person can manufacture a bead-inlaid picture of high quality simply and at a reduced cost without relying on the manual operations of skilled artisan.

What is claimed is:

1. An apparatus for manufacturing a bead-inlaid picture by arranging substantially spherical beads of respective colors on a flat substrate to complete a desired picture, wherein the apparatus comprises;

an image input device for inputting a desired original image as a motif for the bead-inlaid picture, an image processing device for dividing the original image inputted by the image input device into multiple pieces, each of a size equal to that of a bead, comparing numerical data obtained by quantizing the hue and the brightness for each of the pieces with an average density value in each of the pieces and numerical data obtained by quantizing the hue and the brightness for each of the beads, and replacing the numerical data for each of the pieces with a color code allocated to one of the beads having numerical data most approximate therewith and outputting the same, a feeder for separately storing the beads by color codes allocated to them respectively and respectively feeding the beads allocated with the color codes based on the color codes outputted from the image processing device, an arrangement plate adapted for positioning, without fixing, beads from the feeder and, an actuator for arranging the beads fed from the feeder onto the arrangement plate in accordance with an arranged sequence for each of the pieces in the original image to produce a mirror image of the original image.

2. An apparatus for manufacturing a bead-inlaid picture as defined in claim 1, wherein the apparatus comprises a heater;

whereby the arranged beads from the arrangement plate inverted on top of the substrate positioned under the beads can be fused together by the heater.

3. An apparatus for manufacturing a bead-inlaid picture as defined in claim 1, wherein the feeder comprises:

bead distribution mechanisms by the number of colors for supplying beads of respective colors and a hopper for feeding beads fed from each of the bead distribution mechanisms to the actuator, the bead distribution mechanism comprising:

a supply reel having a bead distribution tape wound around the reel in which recesses each containing one bead are formed to the tape continuously at a predetermined pitch and the opening of each recess is covered with a film tape in a state of containing one bead in each recess, a sprocket along which the bead distribution tape dispensed from the feed reel is wound such that the recess opens downwardly at a bead discharge port, a winding mechanism for winding and pulling the film tape at the bead discharge port in a direction peeling from the opening of the recess, an intermittent feeding mechanism for intermittently feeding by one recess the bead distribution tape of a bead distribution mechanism allocated with the color code based on the color code outputted from the image processing device, and a take-up reel for taking-up the intermittently fed bead distribution tape.

4. An apparatus for manufacturing a mosaic by arranging mosaic materials of respective colors on a flat substrate to complete a desired picture, wherein the apparatus comprises:

an image input device for inputting a desired original image as a motif for the mosaic, an image processing device for dividing the original image inputted by the image input device into multiple pieces, each of a size equal to that of a mosaic material, comparing numerical data obtained by quantizing the hue and the brightness for each of the pieces with an average density value in each of the pieces and numerical data obtained by quantizing the hue and the brightness for each of the mosaic materials, and replacing the numerical data for each of the pieces with the color code allocated to one of the mosaic materials having a numerical data most approximate therewith and outputting the same, a feeder for separately storing the mosaic materials by color codes allocated to them respectively and respectively feeding the mosaic materials allocated with the color codes based on the color codes outputted from the image processing device, an arrangement plate adapted for positioning, without fixing, mosaic materials from the feeder and, an actuator for arranging the mosaic materials fed from the feeder onto the arrangement plate in accordance with an arranged sequence for each of the pieces in the original image to produce a mirror image of the original image.

5. An apparatus for manufacturing a mosaic as defined in claim 4, wherein the apparatus comprises a heater; whereby the arranged mosaic materials from the arrangement plate inverted on top of the substrate positioned under the mosaic materials can be fused together by the heater.

6. An apparatus for manufacturing a mosaic as defined in claim 4, wherein the feeder comprises:

mosaic material distribution mechanisms by the number of colors for supplying mosaic materials of respective colors and a hopper for feeding mosaic materials fed from each of the mosaic material distribution mechanisms to the actuator, each mosaic material distribution mechanism comprising:

a supply reel having a mosaic material distribution tape wound around the reel in which recesses each containing one mosaic material are formed in the tape continuously at a predetermined pitch and the opening of each recess is covered with a film tape in a state of containing one mosaic material in each recess, a sprocket along which the mosaic material distribution tape dispensed from the feed reel is wound such that the recess opens downwardly at a mosaic material discharge port, a winding mechanism for winding and pulling the film tape at the mosaic material discharge port in a direction peeling from the opening of the recess, an intermittent feeding mechanism for intermittently feeding by one recess the mosaic material distribution tape of a mosaic material distribution mechanism allocated with the color code based on the color code outputted from the image processing device, and a take-up reel for taking-up the intermittently fed mosaic material distribution tape.

7. An apparatus for manufacturing a bead-inlaid picture by arranging beads of respective colors to complete a desired picture, wherein the apparatus comprises:

an image input device for inputting a desired original image as a motif for the bead-inlaid picture, an image processing device for dividing the original image inputted by the image input device into multiple pieces, each of a size equal to that of a bead, comparing numerical data obtained by quantizing the hue and the brightness for each of the pieces with an average density value in each of the pieces and a numerical data obtained by quantizing the hue and the brightness of each of the beads, and replacing the numerical data for each of the pieces with a color code allocated to one of the beads having numerical data most approximate therewith and outputting the same, a feeder for separately storing the beads by color codes allocated to them respectively and respectively feeding the beads allocated with the color codes based on the color codes outputted from the image processing device and, an actuator for arranging the beads fed from the feeder in accordance with an arranged sequence for each of the pieces in the original image, in which the feeder comprises:

bead distribution mechanisms by the number of colors for supplying beads of respective colors and a hopper for feeding beads fed from each of the bead distribution mechanisms to the actuator, the bead distribution mechanism comprises:

a supply reel having a bead distribution tape wound around the reel in which recesses each containing one bead are formed to the tape continuously at a predetermined pitch and the opening of each recess is covered with a film tape in a state of containing one bead in each recess, a sprocket along which the bead distribution tape dispensed from the feed reel is wound such that the recess opens downwardly at a bead discharge port, a winding mechanism for winding and pulling the film tape at the bead discharge port in a direction peeling from the opening of the recess, an intermittent feeding mechanism for intermittently feeding the bead distribution tape of a bead distribution mechanism allocated with a color code each by one frame for the recess of the bead distribution tape of the bead distribution mechanism allocated with the color code based on the color code outputted from the image processing device, and a take-up reel for taking-up the intermittently fed bead distribution tape.

8. An apparatus for manufacturing a bead-inlaid picture as defined in claim 7, wherein the hopper is disposed at a predetermined position, and each bead distribution mechanisms is adapted such that:

each bead discharge port is formed movably so as to be positioned above the opening of the hopper, and the bead distribution tape is fed intermittently to drop a bead into the hopper in a state where the bead discharging port of the bead distribution mechanism allocated with a color code is situated above the opening of the hopper, based on the corresponding color code outputted from the image processing device.

9. An apparatus for manufacturing a bead-inlaid picture as defined in claim 7, wherein the hopper is disposed movably so as to be situated below the bead discharge port of each bead distribution mechanism, and the hopper is positioned such that the opening of the hopper is positioned below the bead discharge port of a bead distribution mechanism allocated with a color code before a bead is dropped from the bead discharge port, based on the corresponding color code outputted from the image processing apparatus.

* * * * *